United States Patent
Horst et al.

(10) Patent No.: US 9,802,616 B2
(45) Date of Patent: Oct. 31, 2017

(54) METHOD FOR ASSISTING A DRIVER OF A MOTOR VEHICLE

(75) Inventors: Hans-Georg Horst, Leonberg (DE); Ulrich Gottwick, Stuttgart (DE); Juergen Binder, Filderstadt-Plattenhardt (DE); Rodrigo Biurrun Sotelo, Aachen (DE)

(73) Assignee: Robert Bosch GmbH, Stuttgart (DE)

( * ) Notice: Subject to any disclaimer, the term of this patent is extended or adjusted under 35 U.S.C. 154(b) by 542 days.

(21) Appl. No.: 14/241,739

(22) PCT Filed: Jun. 19, 2012

(86) PCT No.: PCT/EP2012/061697
§ 371 (c)(1),
(2), (4) Date: Apr. 15, 2014

(87) PCT Pub. No.: WO2013/029823
PCT Pub. Date: Mar. 7, 2013

(65) Prior Publication Data
US 2014/0229049 A1    Aug. 14, 2014

(30) Foreign Application Priority Data

Aug. 29, 2011 (DE) .......................... 10 2011 081 707

(51) Int. Cl.
*B60L 9/00* (2006.01)
*B60L 11/00* (2006.01)
(Continued)

(52) U.S. Cl.
CPC ..... *B60W 30/188* (2013.01); *B60W 30/18063* (2013.01); *B60W 2520/10* (2013.01);
(Continued)

(58) Field of Classification Search
CPC ..... B60W 2540/106; B60W 30/18063; B60W 30/188
(Continued)

(56) References Cited

U.S. PATENT DOCUMENTS 6,302,823 B1 * 10/2001 Eckert ............... B60K 31/0008
477/186
2002/0115531 A1    8/2002 Degroot et al.
(Continued)

FOREIGN PATENT DOCUMENTS

| DE | 19753764   | 6/1996 |
|----|------------|--------|
| DE | 102009001293 | 9/2010 |
| EP | 1642767    | 4/2006 |
| EP | 2327574    | 6/2011 |
| JP | 2007230271 | 9/2007 |

OTHER PUBLICATIONS

International Search Report for Application No. PCT/EP2012/061697 dated Aug. 6, 2012 (English Translation, 2 pages).

*Primary Examiner* — Harry Oh
(74) *Attorney, Agent, or Firm* — Michael Best & Friedrich LLP

(57) ABSTRACT

The invention relates to a method for assisting a driver of a motor vehicle, in particular of an electric vehicle, during a driving process for overcoming an obstacle which is close to the ground and has a slow speed. In this context, the method has the following steps: transmission (S1) of a torque to the wheels which are to be driven in order to overcome the obstacle, detection (S6) that the obstacle has been overcome, and automatic reduction in the torque and/or automatic generation (S7) of a braking torque in order to decelerate the motor vehicle directly after the detection.

11 Claims, 3 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60W 30/188* (2012.01)
  *B60W 30/18* (2012.01)

(52) U.S. Cl.
  CPC . *B60W 2520/105* (2013.01); *B60W 2540/106* (2013.01); *B60W 2540/12* (2013.01); *B60W 2540/16* (2013.01)

(58) Field of Classification Search
  USPC .......................................................... 701/22
  See application file for complete search history.

(56) References Cited

U.S. PATENT DOCUMENTS

| | | | |
|---|---|---|---|
| 2008/0154472 A1* | 6/2008 | Okuda | B60K 6/44 701/93 |
| 2008/0220934 A1 | 9/2008 | Babcock et al. | |
| 2010/0083936 A1 | 4/2010 | Verdejo et al. | |
| 2011/0066342 A1* | 3/2011 | Ozaki | B60T 7/042 701/70 |
| 2012/0259515 A1* | 10/2012 | Freienstein | B60R 21/0132 701/46 |
| 2014/0019027 A1* | 1/2014 | Kojima | B60L 15/2081 701/102 |
| 2015/0035983 A1* | 2/2015 | Niemz | B60Q 9/008 348/148 |

\* cited by examiner

METHOD FOR ASSISTING A DRIVER OF A MOTOR VEHICLE

BACKGROUND OF THE INVENTION

The invention relates to a method for assisting a driver of a motor vehicle during a driving procedure to overcome a low-level obstacle at slow velocity, and also a control unit, which is designed for the purpose of executing such a method.

When driving using a motor vehicle having a conventional manual shift transmission and internal combustion engine, the driver manually controls, in cooperation with the accelerator pedal and clutch, a start procedure from a standstill over an obstacle (for example, a curbstone), such that a high torque is initially transmitted to the wheels with low clutch slip, in order to overcome the obstacle without stalling the engine. After overcoming the obstacle, the driver opens up the clutch again himself, as soon as the vehicle is set into motion, so that the traction is interrupted again and the vehicle rolls away rapidly.

In a motor vehicle having an automatic transmission with a torque converter, as a result of the characteristic of the torque converter, moderate torque is unfolded as a curbstone is overcome, so that it can be overcome in a controlled manner and with continuous, smooth forward movement of the motor vehicle.

In contrast, the start procedure using an electric vehicle over a stepped obstacle has heretofore been problematic. The driver also initially requests an elevated torque here to overcome the obstacle, by actuating the accelerator pedal. During the travel after overcoming the obstacle, the vehicle suddenly accelerates forward, since the high torque which was built up still acts on the driven wheels. Heretofore it has not been possible to control those driving situations safely and reliably in electric vehicles, in which the electric vehicle accelerates strongly from slow travel in the desired travel direction in such a manner that an excessively high velocity is reached. A relatively long time can pass until the driver has overcome the moment of surprise and reacts appropriately (for example, brakes). Therefore, the acute danger exists of a collision with another vehicle close to the obstacle, for example.

SUMMARY OF THE INVENTION

The method according to the invention for assisting a driver of a motor vehicle, in particular an electric vehicle, during a driving procedure to overcome a low-level obstacle at slow velocity has the following steps: transmitting a torque to the wheels to be driven to overcome the obstacle, recognizing that the obstacle has been overcome, and automatically decreasing the torque and/or automatically producing a braking torque to decelerate the motor vehicle immediately after the recognition.

Furthermore, a control unit for carrying out such a method is provided according to the invention.

The term "low-level obstacle" is understood to mean obstacles which, for example, extend upward from an underlying surface, for example, the ground, of a parking space with a height which is less than 40 cm, preferably less than 30 cm, particularly preferably less than 20 cm. For example, curbstones which are not sunken fall in the range of less than 20 cm. The term "low-level obstacle" also includes objects which do not extend directly upward from the ground, but rather are located above the ground up to an above-mentioned distance.

The term "electric vehicles" is to be understood to include in the wording of this text, for example, motor vehicles driven exclusively via electrical power, but also hybrid vehicles, which have combinations of electric motors with internal combustion engines or fuel cells.

The invention allows safe and reliable control of the start on an obstacle, in particular in the case of electric vehicles. The invention permits uniform and smooth forward movement of the motor vehicle as it overcomes the obstacle. The driver does not have to take any special measures for this purpose or ensure the exact cooperation of accelerator pedal and brake pedal. The above-described hazard of collisions as a result of surprising vehicle reactions is remedied. The problem that the motor vehicle is blocked in its movement path by an obstacle, whereby the drive can overheat, is also remedied. In the method according to the invention, the drive torque and therefore the power consumption of the electrical drive machine are limited. In this way, high energy loads and current spikes of the electrical drive machine are avoided during the starting and therefore a thermal overload of the electrical drive machine or its power electronics is prevented.

According to one embodiment of the method according to the invention, to recognize or register overcoming the obstacle, at least one external and/or one internal variable, such as the roadway inclination and/or statuses of the motor vehicle, such as the velocity and/or the acceleration of the motor vehicle, is registered and analyzed.

The control or regulating algorithms of a control unit which executes the method according to the invention can thus be adapted optimally to the given boundary conditions or the specific operating situation of the motor vehicle.

According to one embodiment variant of the method according to the invention, the motor vehicle is driven by an electric motor. The recognition of overcoming the obstacle is performed by analyzing a characteristic variable of the electric motor, which is characteristic in particular for a load of the electric motor.

On the basis of such characteristic variables (for example, recorded motor current), overcoming the obstacle can be recognized rapidly and reliably, so that the required vehicle reactions can be triggered in a timely manner.

In one embodiment of the method according to the invention, a pressure in a tire of the motor vehicle is analyzed to recognize overcoming the obstacle.

Tire pressure monitoring systems are known from the prior art and can be implemented simply and cost-effectively. Tire pressure monitoring systems are typically provided in any case in modern vehicles, so that the signals delivered by the tire pressure monitoring system can also be used for the present purpose. The additional required expenditure for the method according to the invention is minimal if such tire pressure monitoring systems are present.

According to one embodiment of the method according to the invention, an obstacle situation is recognized if a recognized start indication of the driver exists, an accelerator pedal gradient falls below a predefined threshold value, and, in the event of a buildup of a drive torque to a predefined upper limiting value, no acceleration of the motor vehicle in the travel direction is achieved.

The term "accelerator pedal gradient" is understood as the change of the pedal position as a function of time. The consideration of the accelerator pedal gradient is based on the finding that a driver only actuates the accelerator pedal slowly or hesitantly when controlling the motor vehicle to overcome an obstacle. By such a recognition of the obstacle situation, on the basis of the above-mentioned boundary conditions, the necessity of a start assist can be concluded and it can thus be ensured that the method according to the invention is only executed when it is also actually necessary.

For example, the position of a parking brake and/or a service brake is registered to determine the start indication.

It can thus be ensured that a registered change of the driving resistance has not occurred due to braking.

In one embodiment of the method according to the invention, the position of a selection element, in particular a selection lever, which is movable into various selection positions to select various gear steps to be engaged on the transmission and/or to select various driving programs, is registered to determine the start indication.

A start indication can be reliably derived from the position of the selection lever.

According to one embodiment variant of the method according to the invention, the obstacle is recognized by means of an environmental sensor system or a telemetric unit. The environmental sensor system is embodied in particular as a camera, ultrasound, radar, and/or lidar system. By way of the possibility of the use or the combination of various sensor types, improved reliability can be achieved in the event of changing external conditions (rain, fog, etc.). For example, stepped obstacles can be identified by means of a camera image.

DETAILED DESCRIPTION

Figure 1:
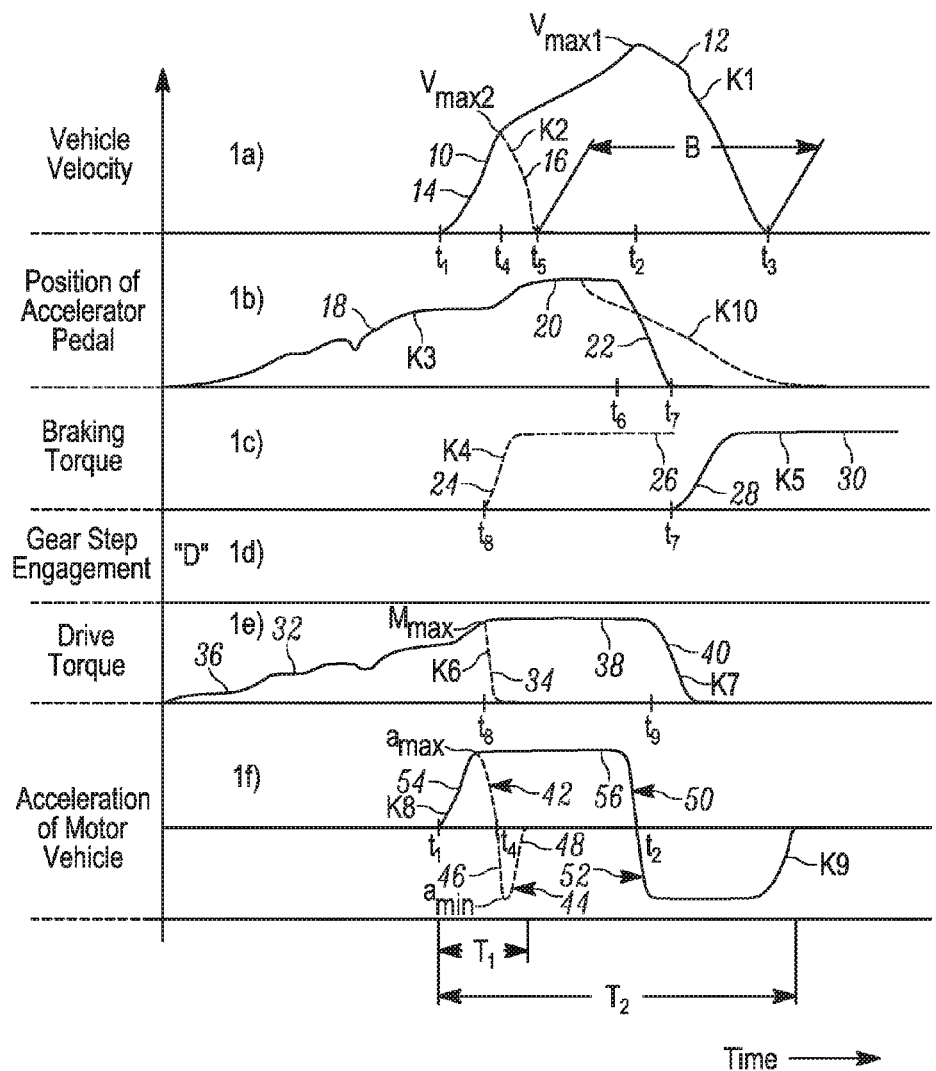
FIG. 1 shows a diagram having a plurality of time-dependent graphs.

FIG. 1 shows the time sequence of one embodiment of the method according to the invention.

The individual graphs 1a) to 1f) of FIG. 1 are each based on the same timescale. In each of the individual graphs, the time curve of the respective ordinate variable is shown by the dashed curve plotted in the Y-direction in the method according to the invention, in which automatic activation of the drive units and the deceleration units of an electric vehicle is performed. Correspondingly, the profile of the individual ordinate variables during conventional starting of the electric vehicle is shown by the solid lines. I.e., the driver controls the starting procedure in a conventional manner using gas pedal and brake pedal.

Graph 1a shows the vehicle velocity as a function of time. The curve K1, which shows the profile of the vehicle velocity during a conventional start of the electric vehicle, has a rising section 10, which rises steeply at moment $t_1$, starting from the value 0. The curve K1 shows a first velocity maximum $V_{max1}$, which means in other words that the initially strongly rising vehicle velocity gradually attenuates, until the vehicle velocity reaches the maximum $V_{max1}$ at the moment $t_2$. After passing through the maximum $V_{max1}$, the vehicle velocity falls steeply, as shown by the falling section 12, and again reaches the value 0 at the moment $t_3$.

The dashed curve K2 in FIG. 1a shows the time curve of the vehicle velocity in the case of the method according to the invention. A steep section 14 of the curve K2 first runs in correspondence with the curve of the velocity in the conventional method. This correspondence can be explained in that overcoming the curbstone only occurs at the moment $t_4$ and before the moment $t_4$, in the conventional method and in the method according to the invention, an acceleration of the electric vehicle occurs in response to the drive torque indication requested by pressing down the accelerator pedal.

As soon as the drive torque requested by the driver via an actuation of the accelerator pedal is sufficient to drive over the electric vehicle against the travel resistance of the obstacle, at the moment $t_1$, the velocity rises steeply originating from the value 0, as illustrated by the rising steep section 14. The curve K2 passes through a second velocity maximum $V_{max2}$ at the moment $t_4$. After passing through the second velocity maximum $V_{max2}$, the velocity falls rapidly, as described by the falling steep section 16, and reaches the value 0 at the moment $t_5$.

FIG. 1b shows the position of the accelerator pedal as a function of time. The curve K3, which shows the time curve in the conventional method, may be coarsely divided into three sections, specifically in detail into a rising section 18, a parallel section 20 running approximately parallel to the abscissa, and a steeply falling steep section 22.

The slight slope of the rising section 18 indicates that the driver presses down the accelerator pedal slowly. I.e., the driver recognizes the situation of starting on the curbstone and requests a corresponding drive torque by slow accelerator pedal actuation. The rising section merges continuously into the parallel section 20. In other words, this means that from a specific moment, the accelerator pedal is not deflected further, but rather is kept constant for a while—as described by the parallel section 20. At the moment $t_6$, the driver experiences a strong acceleration of the motor vehicle and as a result suddenly releases the accelerator pedal, so that the accelerator pedal at moment $t_7$ again reaches its idle position.

In graph 1c, the braking torque which decelerates the electric vehicle is plotted along the ordinate and the time is plotted along the abscissa. The curve K4 shows the profile during the method according to the invention. Two subsections may be defined on the curve K4, a steeply rising steep section 24 and a parallel section 26 running approximately parallel to the x axis. At the moment $t_8$, the control unit according to the invention registers by means of corresponding sensors that the curbstone has been overcome. In order to prevent undesired strong forward acceleration of the motor vehicle, the electric vehicle—as shown by the steep section 24—is automatically decelerated immediately after overcoming the curbstone by a braking intervention, which can be provided, for example, by a brake controlled by an electronic stability program (ESP).

The profile of the braking torque in the conventional method is described by the curve K5. The curve K5 corresponds with respect to the qualitative profile to the curve K4 and again has a steeply rising steep section 28 and a parallel section 30. The steep section 28 rises steeply at the moment $t_7$, at which the reaction of the driver to the sudden acceleration of the motor vehicle after overcoming the curbstone begins and the driver rapidly presses down the brake pedal. At the same moment $t_7$—as shown in FIG. 1b—the accelerator pedal has reached its idle position, which means that the driver has changed his foot from the accelerator pedal to the brake pedal at the moment $t_7$. As a result of the substantially slower reaction of the driver in comparison to the automatic braking intervention, the curve K5 runs offset to the curve K4 with respect to time for a specific time in the positive x direction.

The graph 1d indicates that the gear step engaged on the transmission is continuously located at the position "D".

In the graph 1e, the drive torque of the motor vehicle is plotted as a function of time. The curve K6 describes the profile of the drive torque in the method according to the invention. The curve K6 shows a flatly increasing rising section 32, which reaches a local maximum $M_{max}$ at the moment $t_8$ and merges into a steeply falling steep section 34 after passing through the maximum $M_{max}$. This falling steep section 34 describes a rapid reduction of the drive torque initiated by the control unit implemented according to the invention immediately after recognizing the overcoming the obstacle (moment $t_4$). The drive torque transmitted to the driven wheels is adapted to the building braking force (FIG. 1c), so that rapid but comfortable braking is made possible. A comparison between FIGS. 1e and 1c shows that the drive torque is reduced to zero upon beginning braking force, so that the brake is not excessively loaded.

The curve K7 illustrates the profile of the drive torque in the conventional method. The curve K7 shows a flatly increasing rising section 36, which therefore corresponds to the rising section 32 of the curve K6, because in the conventional method and in the method according to the invention, the drive torque is respectively requested via the accelerator pedal actuation (FIG. 1b) of the driver before overcoming the obstacle (at the moment $t_4$). The rising section 36 merges at the moment $t_8$ into a parallel section 38 running parallel to the abscissa, which in turn merges at the moment $t_9$ into a falling steep section 40.

FIG. 1f shows the time curve of the accelerations of the motor vehicle. The acceleration curves correspond to the first derivatives with respect to time of the velocity curves shown in FIG. 1a. The curve K8 illustrates the acceleration of the motor vehicle as a function of time in the method according to the invention. The curve K8 has an upper peak section 42 similar to a parabola open at the bottom, for which all Y coordinates, i.e., the vehicle accelerations, are positive (acceleration of the electric vehicle in the stricter sense). The upper peak section 42 illustrates how the vehicle acceleration initially strongly rises to the moment $t_1$ and rapidly reaches a maximum value $a_{max}$, to attenuate steeply and rapidly after passing through the maximum $a_{max}$ under the influence of the automatic braking intervention with simultaneous reduction of the drive torque, until the vehicle acceleration firstly passes through a zero crossing (in which the vehicle velocity is constant for a moment). After the zero crossing, the curve K8 merges into a parabola-like lower peak section 44, in which all Y values are negative (deceleration of the motor vehicle in the stricter sense). The deceleration of the motor vehicle initially strongly increases after the zero crossing, which occurs at the moment $t_4$, as described by the negative steep section 46, passes through a local minimum $a_{min}$, and then gradually decreases, as illustrated by the rising section 48. Overall, the curve K8 shows a periodic curve profile, so that a first period duration $T_1$ may be defined.

The curve K9, which describes the time curve of the vehicle acceleration in the conventional method, shows an upper trapezoidal section 50, which is located in the first quadrant and therefore represents accelerations of the motor vehicle in the stricter sense, and which approximately repeats with changed sign after a zero crossing, so that overall an approximately periodic profile results for the curve K9. Therefore, a second period duration $T_2$ may be defined. After the zero crossing, which occurs at the moment $t_2$, the curve K9 lies with a lower trapezoidal section 52 in the fourth quadrant, which means that the accelerations of the electric vehicle are negative at the corresponding moments. The upper trapezoidal section 50 has a steep section 54, which corresponds to a steep section of the curve K8 of the method according to the invention and represents an acceleration of the motor vehicle in response to the drive torque requested by pressing down the accelerator pedal. The acceleration remains constant for a specific duration at a maximum value, as described by the parallel section 56 of the curve K9. In other words, this means that the electric vehicle moves forward for a comparatively long time at high acceleration, which first drops steeply due to the brake actuation of the driver and has the zero crossing at the moment $t_2$. In the case of such a long-lasting high acceleration of the electric vehicle, the acute hazard exists of a collision with an object, for example, a further vehicle in proximity. Furthermore, the high maximum velocity $V_{max1}$ (FIG. 1a) is reached by the long acceleration phase, which is a multiple of the maximum velocity $V_{max2}$ in the method according to the invention (FIG. 1a).

The automatic vehicle reactions, in contrast, occur practically without a time delay, because the sensors deliver corresponding output signals for further processing to the control unit according to the invention directly after overcoming the obstacle. In comparison thereto, the driver reacts comparatively slowly. This different reaction behavior between the control unit according to the invention and the driver has the result, on the one hand, that the period duration $T_2$ of the vehicle acceleration profile in the conventional method is a multiple of the period duration $T_1$ of the method according to the invention ($T_2 \gg T_1$).

The different reaction times also have an effect on the stopping distance of the motor vehicle. The stopping distance is determined from the distance covered during the reaction time and the actual braking distance. Since the reaction time is practically 0 in the case of the automatic controller, in this case, the stopping distance is significantly less. The time span indicated by the arrow B in FIG. 1a is a measure of this difference of the stopping distance of the conventional method in relation to the method according to the invention.

The actuation of the accelerator pedal by the driver in the method according to the invention is apparent from FIG. 1b. Therein, the curve K10 shows the profile of the accelerator pedal position in the method according to the invention. After the beginning of the automatic braking or deceleration procedure (moment $t_8$), the accelerator pedal is still deflected comparatively far from the idle position. The vehicle is nonetheless decelerated (FIG. 1f). This means that the control command mechanism has predominance over the manual actuation of the driver, to adapt the manual and automatic control commands to one another. After the driver experiences a deceleration of the vehicle at the moment $t_4$, he slowly releases the accelerator pedal after a corresponding reaction time, to thus prevent the mechanism, which intends a deceleration of the vehicle, and the driver from working against one another. In the event of manual control command inputs and automatically generated control signals which supplement one another excessively strongly, an automatic adaptation of these control signals to one another can be performed, for example, to prevent excessively strong deceleration of the motor vehicle.

Figure 2A:
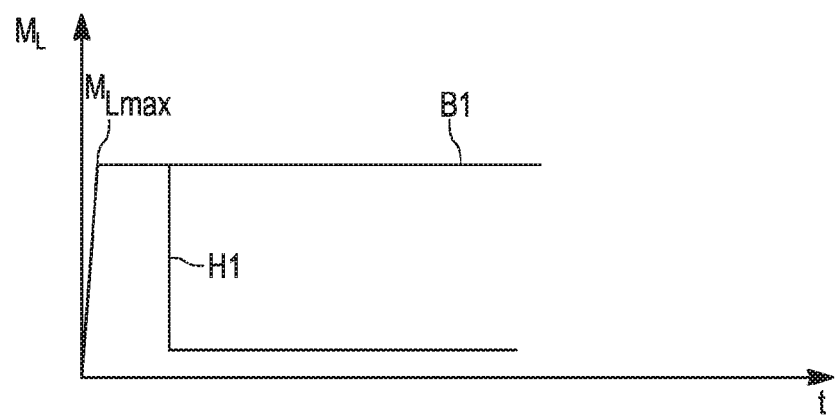
FIG. 2a shows a graph in which the motor torque of the electrical drive machine is shown when starting on the hill and on the curbstone as a function of time.
Figure 2B:
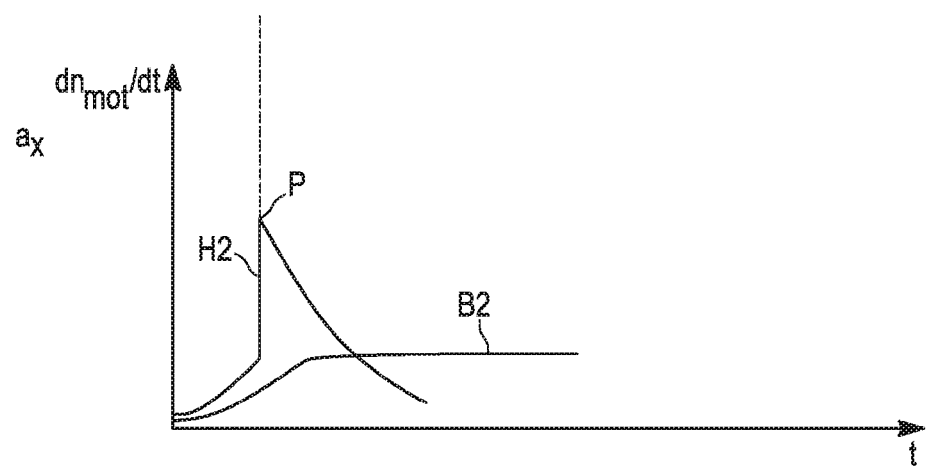
FIG. 2b shows a graph which illustrates the time curve of the acceleration of the motor vehicle when starting on the hill and on the curbstone.

In order to initiate a situation-appropriate vehicle reaction in each case in the method according to the invention, it is preferably to be checked whether an obstacle situation actually exists, i.e., whether an obstacle is actually to be overcome, or whether a high travel resistance has other causes, for example, a start on a slope (hill start). For this purpose, FIG. 2a shows a graph, in which the motor torque $M_L$ of the electric motor driving the electric vehicle is plotted as a function of time during a hill start (curve B1) and a start over an obstacle (curve H1). FIG. 2b shows a further graph, in which the motor rotational acceleration ($dn_{mot}/dt$) or vehicle longitudinal acceleration ($a_x$) during the hill start (curve B2) and during the start over the obstacle (curve H2) is plotted as a function of time. The two graphs 2a and 2b are based on the same timescale. During a hill start and during the start over the obstacle, the motor torque $M_L$ initially rises to a maximum value $M_{Lmax}$, without the motor vehicle moving. The characteristic differentiating feature during the start on the curbstone, however, is the sudden reduction of the load torque when the obstacle has been overcome. This can be established, for example, by the jump of the motor torque $M_L$ described by the peak P (detectable, for example, by a sudden rotational acceleration of the rotor and/or changed power consumption of the electrical drive machine). Therefore, a way is shown in which a start on a blocking obstacle can be differentiated from a start on a slope.

Figure 3:
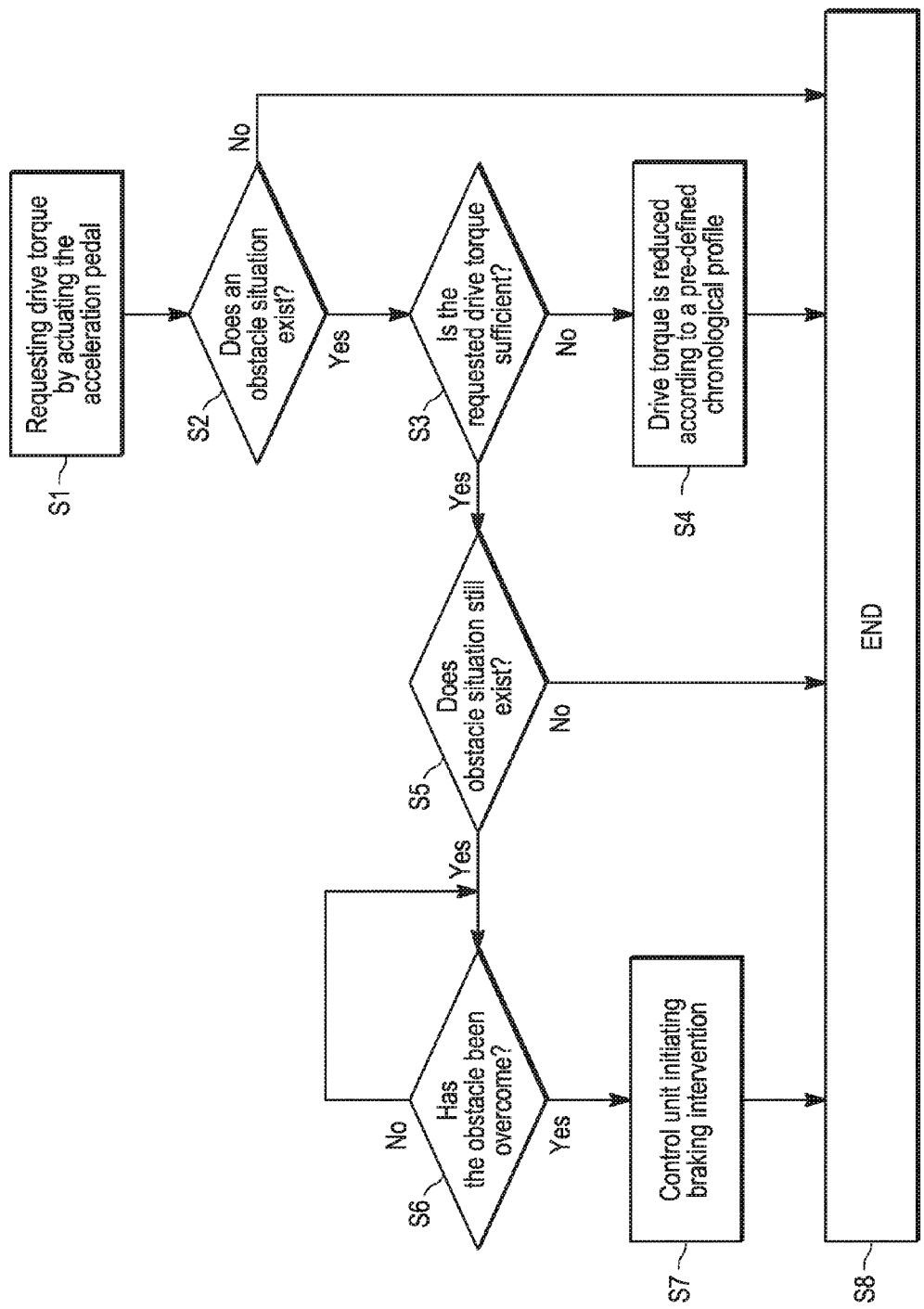
FIG. 3 shows a flow chart of a method according to the invention.

FIG. 3 shows a flow chart of the method according to the invention. The method starts in step S1, in which a driver requests a drive torque by actuating the accelerator pedal. After step S1, the method progresses to step S2. In step S2, it is checked whether an obstacle situation exists, i.e., whether there is a driving situation in which a low-level obstacle is to be overcome. Such an obstacle situation is recognized if the following events or boundary conditions a) to f) are fulfilled:

a) the control unit according to the invention receives the signal "vehicle standstill", b) the control unit according to the invention receives the signal "parking brake not actuated", c) the control unit according to the invention receives the signal "service brake not actuated", d) the gear step engaged on the transmission is not "N" or "P", e) the accelerator pedal gradient falls below a predefined minimal threshold value (which means that the accelerator pedal is hesitantly actuated), f) the drive torque corresponding to the driver indication exceeds a predefinable upper threshold value, without the motor vehicle moving.

In the case of a negative test result in step S2, the method is ended in ending step S8.

In the case of a positive test result in step S2, the method is continued with step S3. In step S3, it is checked whether the drive torque requested by the driver is sufficient to overcome the obstacle.

In the case of a negative test result in step S3 (i.e., the drive torque is not sufficient to overcome the obstacle), the method progresses to step S4.

In step S4, to protect components from thermal overload after an applicable time, the drive torque is reduced in accordance with a predefinable chronological profile, for example, a ramped profile, and simultaneously a corresponding warning message is output to the driver.

After step S4, the method is ended in ending step S8.

In the case of a positive test result in step S3, the method is continued with step S5, in which it is checked whether an obstacle situation exists or an elevated travel resistance possibly has another cause, for example, a start on a hill. To avoid repetitions, reference is made to the preceding description of FIGS. 2a and 2b, where a possibility of how an obstacle situation can be differentiated from a hill start is described in detail.

In the decision S5, the method branches depending on whether or not an obstacle situation actually exists. If it is established in the decision S5 that no obstacle situation exists, the method is ended in step S8.

If it is established in the decision S5 that an obstacle situation exists, i.e., an obstacle is to be overcome, the method passes to step S6.

In step S6, it is registered by a sensor system whether the obstacle has already been overcome. If it is registered in step S6 that the obstacle has been overcome, the method is continued with step S7. In step S7, the control unit according to the invention automatically initiates a braking intervention, which can be provided, for example, by a brake controlled by an electronic stability program. Simultaneously, the control unit according to the invention initiates a rapid reduction of the drive torque transmitted to the driven wheels in step S7. The drive torque is adapted to the building braking force, so that rapid but comfortable braking is made possible. After step S7, the method is ended in step S8.

If it is established in step S6 that the obstacle has not been overcome, step S6 is repeated until overcoming of the obstacle is established.

In summary, the invention provides a method which relieves the driver during difficult driving situations, in each of which a curbstone is to be overcome, for example, a parking procedure in a parking space or when driving out of a vehicle exit. By way of the invention, it is possible to control such driving situations safely and reliably, in particular in the case of electric vehicles.

It is obvious that the present invention can be altered in manifold ways without leaving the idea of the invention.

Thus, for example, it is conceivable that after overcoming an obstacle or a high travel resistance (for example, if a boat trailer is to be pulled out of the water or another vehicle is to be pulled out of a ditch), no reduction of the drive torque or even an increase of the acceleration is desired. A system executing the method according to the invention can be deactivated by a corresponding driver indication, which is given, for example, by actuating the ESP off button. In this case, only the above-mentioned thermal protection engages.

Furthermore, it is fundamentally possible to also use the invention in conventional motor vehicles, which are solely driven by an internal combustion engine.

The invention claimed is:

1. A method for assisting a driver of a motor vehicle during a driving procedure to overcome an obstacle on a roadway at a first velocity, the method comprising:
   actuating an acceleration pedal;
   transmitting a drive torque to the wheels of the motor vehicle;
   analyzing, with a control unit, a recorded motor current of an electric motor configured to drive the motor vehicle;
   recognizing that the obstacle is present, when an acceleration pedal gradient associated with the acceleration pedal falls below a threshold value and when a buildup in the drive torque results in no acceleration of the motor vehicle in a first direction; and
   automatically decreasing the drive torque and producing a braking torque to decelerate the motor vehicle upon recognizing the obstacle has been overcome.

2. The method as claimed in claim 1, wherein recognizing that the obstacle has been overcome includes determining the presence of a roadway inclination associated with the roadway.

3. The method as claimed in claim 1, wherein recognizing that the obstacle has been overcome includes monitoring a pressure in a tire of the motor vehicle.

4. The method as claimed in claim 1, wherein an obstacle situation is recognized if a recognized start indication of the driver exists, the accelerator pedal gradient falls below the predefined threshold value, and, in the event of a buildup of a drive torque to a predefined upper limiting value, no acceleration of the motor vehicle in the travel direction is achieved.

5. The method as claimed in claim 4, wherein the position of a parking brake and/or a service brake is registered to determine the recognized start indication.

6. The method as claimed in claim 4, wherein the position of a selection element, which is movable into various selection positions to select various gear steps to be engaged on the transmission and/or to select various driving programs, is registered to determine the recognized start indication.

7. The method as claimed in claim 1, wherein the obstacle is recognized by means of an environmental sensor system.

8. The method as claimed in claim 7, wherein the environmental sensor system is embodied as at least one of a camera, an ultrasound system, a radar system, and a lidar system.

9. The method of claim 1, wherein automatically decreasing the drive torque further comprises:

decreasing the drive torque using a predefined chronological profile, wherein the chronological profile includes a ramped profile.

10. An electric vehicle configured to execute a method to overcome an obstacle at a first velocity, the method comprising:

actuating an acceleration pedal;

transmitting a drive torque to the wheels of the electric vehicle to overcome the obstacle;

analyzing, with a control unit, a recorded motor current of an electric motor configured to drive the electric vehicle to overcome the obstacle;

recognizing that the obstacle is present, when an acceleration pedal gradient associated with the acceleration pedal falls below a threshold value and when a buildup in the drive torque results in no acceleration of the motor vehicle in a first direction; and at least one selected from the group consisting of automatically decreasing the drive torque and automatically producing a braking torque to decelerate the electric vehicle immediately after the recognition that the obstacle has been overcome.

11. The electric vehicle of claim 10, wherein automatically decreasing the torque further comprises:

decreasing the drive torque using a predefined chronological profile, wherein the chronological profile of the drive torque includes a ramped profile.

* * * * *